(12) United States Patent
Kildal et al.

(10) Patent No.: US 11,088,768 B2
(45) Date of Patent: Aug. 10, 2021

(54) METHOD AND APPARATUS FOR TESTING WIRELESS COMMUNICATION TO VEHICLES

(71) Applicant: RANLOS AB, Gothenburg (SE)

(72) Inventors: Per-Simon Kildal, Pixbo (SE); Andrés Àlayon Glazunov, Upplands Väsby (SE)

(73) Assignee: RANLOS AB, Gothenburg (SE)

( * ) Notice: Subject to any disclaimer, the term of this patent is extended or adjusted under 35 U.S.C. 154(b) by 0 days.

(21) Appl. No.: 16/063,364

(22) PCT Filed: Dec. 15, 2016

(86) PCT No.: PCT/EP2016/081251
§ 371 (c)(1),
(2) Date: Jun. 18, 2018

(87) PCT Pub. No.: WO2017/102980
PCT Pub. Date: Jun. 22, 2017

(65) Prior Publication Data
US 2018/0375594 A1    Dec. 27, 2018

(30) Foreign Application Priority Data

Dec. 16, 2015 (EP) .................................... 15200448

(51) Int. Cl.
*H04B 17/10* (2015.01)
*H04B 17/29* (2015.01)
(Continued)

(52) U.S. Cl.
CPC ........... *H04B 17/102* (2015.01); *H01Q 15/14* (2013.01); *H01Q 21/061* (2013.01); *H04B 17/29* (2015.01); *H04B 17/12* (2015.01)

(58) Field of Classification Search
CPC .... H01Q 15/14; H01Q 21/061; H04B 17/102; H04B 17/11; H04B 17/12; H04B 17/13;
(Continued)

(56) References Cited

U.S. PATENT DOCUMENTS 5,739,695 A * 4/1998 Zerod ................ G01R 29/0814
324/637
7,880,670 B2 * 2/2011 Villarroel ........... G01R 29/0871
342/165

(Continued)

FOREIGN PATENT DOCUMENTS

CN       2686219 Y  *  3/2005
CN      103163340 A     6/2013
(Continued)

OTHER PUBLICATIONS

P.-S. Kildal and K. Rosengren, Correlation and capacity of MIMO systems and mutual coupling, radiation efficiency and diversity gain of their antennas: Simulations and measurements in reverberation chamber, Dec. 2005, IEEE, IEEE Communications Magazine, vol. 42, No. 12, pp. 102-112 (Year: 2005).*

(Continued)

*Primary Examiner* — Eric Nowlin
(74) *Attorney, Agent, or Firm* — Buchanan Ingersoll & Rooney P.C.

(57) ABSTRACT

An apparatus for measuring over-the-air (OTA) wireless communication performance in an automotive application of a device under test (DUT) arranged on or in a vehicle. The apparatus includes a chamber defining an internal volume therein, such as an EMC chamber or a semi-anechoic chamber. Further, a rotatable platform for supporting the vehicle is provided enclose in the internal volume, together with at least one chamber antenna. A communication system test instrument is further provided for measuring the transmission between the device under test and the chamber (Continued)

antenna. The chamber antenna is an array antenna, including a horizontal linear array of antenna elements, the chamber antenna preferably providing a plane wave in near-field where the vehicle is located. The array may further include a plurality of horizontal linear arrays, overlying each other in a vertical direction.

13 Claims, 5 Drawing Sheets

(51) Int. Cl.
    *H01Q 15/14*      (2006.01)
    *H01Q 21/06*      (2006.01)
    *H04B 17/12*      (2015.01)

(58) Field of Classification Search
    CPC ........ H04B 17/15; H04B 17/16; H04B 17/17; H04B 17/18; H04B 17/19; H04B 17/29; H04W 16/28; H04W 24/06; H04W 24/08; H04W 24/10; H04W 52/02
    See application file for complete search history.

(56) References Cited

U.S. PATENT DOCUMENTS

| | | | |
|---|---|---|---|
| 8,331,869 B2 * | 12/2012 | Foegelle | H04B 17/0082 455/67.12 |
| 2008/0056340 A1 * | 3/2008 | Foegelle | H04B 17/29 375/224 |
| 2008/0309565 A1 * | 12/2008 | Villarroel | G01R 29/0871 343/703 |
| 2010/0109932 A1 | 5/2010 | Liu | |
| 2013/0147650 A1 | 6/2013 | Ho | |
| 2014/0327586 A1 * | 11/2014 | Huff | G01R 29/0821 343/703 |
| 2016/0079672 A1 * | 3/2016 | Cerreno | H01Q 21/065 343/848 |
| 2016/0372835 A1 * | 12/2016 | Toso | H01Q 19/192 |
| 2018/0102591 A1 * | 4/2018 | Rowell | H01Q 3/267 |
| 2019/0115941 A1 * | 4/2019 | Noda | G01R 29/10 |
| 2020/0119460 A1 * | 4/2020 | Maruo | G01R 29/105 |

FOREIGN PATENT DOCUMENTS

| | | | | |
|---|---|---|---|---|
| CN | 203203804 U | | 9/2013 | |
| CN | 103364596 A | * | 10/2013 | ......... G01R 29/0821 |
| CN | 104601258 A | | 5/2015 | |
| CN | 106526550 A | * | 3/2017 | |
| CN | 111044801 A | * | 4/2020 | ............ H01Q 21/29 |
| EP | 3182619 A1 | * | 6/2017 | ........... H04B 17/102 |
| FR | 2975781 A1 | | 11/2012 | |
| JP | S59-37713 A | | 3/1984 | |
| JP | 2001-201526 A | | 7/2001 | |
| JP | 2010-124415 A | | 6/2010 | |
| JP | 2013-504981 A | | 2/2013 | |
| JP | 2015-531577 A | | 11/2015 | |
| WO | 2011/034937 A1 | | 3/2011 | |
| WO | 2014/062112 A1 | | 4/2014 | |
| WO | 2015/113649 A1 | | 8/2015 | |
| WO | 2015/113667 A1 | | 8/2015 | |
| WO | WO-2015113649 A1 | * | 8/2015 | ........... H04B 17/102 |

OTHER PUBLICATIONS

Orlenius et al., Measurements of total isotropic sensitivity and average fading sensitivity of CDMA phones in reverberation chamber, Dec. 12, 2005, IEEE, 2005 IEEE Antennas and Propagation Society International Symposium, DOI: 10.1109/APS.2005. 1551339 (Year: 2005).*

Rosengren et al., Radiation efficiency, correlation, diversity gain and capacity of a six-monopole antenna array for a MIMO system: theory, simulation and measurement in reverberation chamber, Apr. 4, 2005, IET, IEE Proceedings—Microwaves, Antennas and Propagation, vol. 152, No. 1, pp. 7-16 (Year: 2005).*

Secmen et al., A compact corporate probe fed antenna array, Nov. 6, 2006, IEEE, 2006 First European Conference on Antennas and Propagation, pp. 1-4, doi: 10.1109/EUCAP.2006.4584604 (Year: 2006).*

Betancourt et al., A Novel Methodology to Feed Phased Array Antennas, Sep. 4, 2007, IEEE, IEEE Transactions on Antennas and Propagation, vol. 55, No. 9, pp. 2489-2494, doi: 10.1109/TAP.2007. 904133 (Year: 2006).*

Kildal et al., Cost-effective measurement setups for testing wireless communication to vehicles in reverberation chambers and anechoic chambers, Nov. 16, 2014, 2014 IEEE Conference on Antenna Measurements & Applications (CAMA), pp. 1-4, doi: 10.1109/CAMA.2014.700342810 (Year: 2014).*

Office Action (The First Office Action) dated Jul. 1, 2020, by the State Intellectual Property Office of the People's Republic of China in corresponding Chinese Patent Application No. 201680072904.2, and an English Translation of the Office Action. (14 pages).

Office Action (Notice of Reasons for Refusal) dated Oct. 20, 2020 by the Japanese Patent Office in corresponding Japanese Patent Application No. 2018-530017 and an English Translation of the Office Action. (11 pages).

Raza, H. et. al. "Wideband Compact 4-Port Dual Polarized Self-Grounded Bowtie Antenna, IEEE Transactions on Antennas and Propagation", Sep. 2014, vol. 62, No. 9, 6 pages.

Ovidio Mario Bucci, et al., "Plane-Wave Generators: Design Guidelines, Achievable Performances and Effective Synthesis", IEEE Transactions on Antennas and Propagation, Apr. 2013, pp. 2005-2018, vol. 61, No. 4.

Hsi-Tseng Chou, et al., "An Effective Synthesis of Planar Array Antennas for Producing Near-Field Contoured Patterns", IEEE Transactions on Antennas and Propagation, Sep. 2011, pp. 3224-3233, vol. 59, No. 9.

Randy Haupt, "Synthesis of a Plane Wave in the Near Field with a Plannar Phased Array", IEEE Antennas and Propagation Society International Symposium, Jun. 22, 2003, pp. 792-795, vol. 1.

Hui Wang, et al., "Generating Plane Waves in the Near Fields of Pyramidal Horn Arrays", Antennas, Propagation & EM Theory (ISAPE), 2012 10th International Symposium ON, IEEE, Oct. 22, 2012, pp. 211-218.

International Search Report (PCT/ISA/210) dated Mar. 27, 2017, by the European Patent Office as the International Searching Authority for International Application No. PCT/EP2016/081251.

Written Opinion (PCT/ISA/237) dated Mar. 27, 2017, by the European Patent Office as the International Searching Authority for International Application No. PCT/EP2016/081251.

* cited by examiner

METHOD AND APPARATUS FOR TESTING WIRELESS COMMUNICATION TO VEHICLES

TECHNICAL FIELD OF THE INVENTION

The present invention relates to a new compact and cost-effective test chamber/apparatus for wireless communications to vehicles.

BACKGROUND

The wireless communications grow, and recent digital communication systems like LTE or 4G are very advanced with both MIMO (Multiple Input Multiple Output) multiport antenna technology and OFDM (Orthogonal Frequency Domain Multiplexing). An important new market segment that will continue to grow fast is wireless communications to cars, buses and other vehicles, hereinafter and commonly referred to as automotive applications. The purpose is often to entertain the passengers, but also to provide services that make it safer to drive the car.

In particular, autonomous automotive applications, such as autonomous cars—i.e. self-driving cars with minimal human interaction—will soon become a reality on our roads. Many potential advantages with autonomous cars have been identified, such as reduced traffic congestion, increased roadway capacity, improved environmental footprint, etc. However, autonomous automotive applications require reliable and secure wireless connections to existing networks in order to achieve the desired improvements. Therefore, there is presently an acute need for reliable and cost-efficient Over-The-Air (OTA) testing of wireless communications to cars and other automotive applications, and between vehicles on the road.

In WO 15/113667 by the same applicant, a very efficient solution to this has been proposed. Here, test apparatuses are provided both for measurement in a test chamber having inwardly reflective walls—a multipath reverberation chamber—for emulation and measurement in rich isotropic multipath (RIMP) environment, and for measurement in anechoic or semi-anechoic chambers for emulation and measurement of Random Line-of-Sight (random-LOS or RLOS) propagation channels. In anechoic chambers there is only one incident wave on the device under test (DUT). This is referred to as a Line-Of-Sight (LOS) and comes from a well-defined direction given by an Angle-of-Arrival (AoA). Indeed, autonomous cars travelling along highways will often be in Line-of-Sight (LOS) connection to the base station, or to other vehicles. Likewise, communication to nearby cars will take place in LOS. However, the direction to the base station or neighboring car will change randomly, depending on the relative orientations of the cars. Thus, the Angle-of-Arrival (AoA) of the LOS relative to the car can be treated as a random variable over the full (or in some cases limited) angular range in azimuth.

A hypothesis was formulated in the paper "Rethinking the Wireless Channel for OTA testing and Network Optimization by Including User Statistic: RIMP, Pure-LOS, Throughput and Detection Probability", P.-S. Kildal, ISAP 2013, viz. that if a wireless device is proven to work well in RIMP and RLOS, it will work well in all real-life environments. This hypothesis is looked upon as reasonable in the antennas and propagation society. The communication characterization of devices in RIMP OTA is now rather well understood. However, much less is known about the performance of a device operating in the RLOS propagation channel, and even if the solution in WO 15113667 has worked very well for such measurements, there is still a need for improved measurement apparatuses and methods for measuring in RLOS environments, in particular for automotive applications.

Specifically, there is a need for more cost-efficient OTA chambers for testing wireless communications to vehicles, still having similar or even improved measurement quality than in the presently available systems.

SUMMARY OF THE INVENTION

It is therefore an object of the present invention to alleviate the above-discussed problems, and specifically to introduce a new compact and cost-effective test chamber/apparatus for automotive applications, for characterizing wireless communications, devices and equipment in random-LOS environments.

According to a first aspect of the invention there is provided an apparatus for measuring over-the-air (OTA) wireless communication performance in an automotive application of a device under test arranged on or in a vehicle, comprising:
 a chamber defining an internal volume therein;
 a platform for supporting the vehicle, wherein the chamber is adapted to enclose the platform and wherein the platform is a rotatable platform that can rotate the vehicle;
 at least one chamber antenna provided in the volume; and
 a communication system test instrument measuring the transmission between the device under test and the chamber antenna;
 wherein the chamber antenna is an array antenna, comprising a horizontal linear array of antenna elements, the chamber antenna preferably providing a plane wave in near-field where the vehicle is located. The array antenna may be two-dimensional array, having several horizontal linear arrays overlying each other in a vertical direction, thereby forming a vertically-oriented (or almost vertically-oriented) planar two-dimensional array of antenna elements. Particularly in the latter case the array provides a plane wave in the near-field where the car is located.

The term "device under test" is in the context of this application used to indicate any type of device capable of transmitting or receiving electromagnetic signals through a wireless interface. In particular, the device under test can be mobile phones and other wireless terminals with antennas, and these devices or parts of them such as the antennas can be either mounted to the vehicle, integrated with the vehicle, or carried by the users of the vehicles or its passengers. However, preferably the antenna(s) are arranged exteriorly on the vehicle.

The invention is based on the understanding that real-life environments for wireless communication with vehicles, such as cars and busses, are somewhere in between the edge environments of free space (pure-LOS) and rich isotropic multipath (RIMP), and if wireless terminals work well in RIMP and random pure-LOS environments, they will work well also in real-life environments. Rough estimates indicate that for handheld smart phones and laptops in general situations, the relative importance of RIMP and random-LOS could be approximately 80-90 percent for RIMP and 10-20 percent for random-LOS. For vehicles on the road, the situation would be roughly the opposite, with approximately 20 percent for RIMP and 80 percent for random-LOS. Thus, the testing in random-LOS is much more important for automotive applications than for other general usages. Still further, the present invention is based on the understanding that it is also possible to use the Probability of Detection (PoD) on one or more bitstreams as a metric of performance in random-LOS environments. The present invention relates to a way of measuring PoD in random-LOS, which in particular is advantageous for automotive tests of complete vehicles such as cars, trucks and buses. The PoD corresponds to the average throughput measured by communication system test instruments, when the DUT or the whole vehicle is moving in the environment.

The present invention provides a very cost-efficient OTA chamber for testing wireless communications to vehicles, useable for testing in random-LOS. Further, by means of the present invention, a more robust system is provided, and similar or even improved measurement quality than in the presently available systems will be obtained.

The horizontal array sees the whole length of the car or vehicle, thereby covering all antenna locations on the car/vehicle with the plane wave from the base stations, ie. from the array. The coverage is even further improved with a tiltable array antenna (see below).

The over-the-air (OTA) wireless communication performance measurable by means of the present invention is preferably one or several of the following: total radiated power (TRP), total isotropic sensitivity (TIS), throughput, antenna efficiency, average fading sensitivity, and diversity and MIMO gain. Antenna efficiency is here used as a measure of the efficiency with which an antenna converts the radio-frequency power accepted at its terminals into radiated power. Diversity and MIMO gain is here used as a measure of the improvement in PoD obtainable by using multiple antennas.

According to the present invention, the vehicle to be tested is located on a rotatable platform, which preferably can rotate the car 360 degrees. The platform is preferably arranged to be rotatable continuously or intermittently during measurement. The rotation may be controlled by a control PC, in the same way as for the per se known platform stirring used in U.S. Pat. Nos. 7,444,264, 7,286,961 and WO 12/171562, said documents hereby being incorporated in their entirety by reference. The walls of the chamber are preferably absorbing. If all internal surfaces are non-reflective, the chamber is an anechoic chamber. However, the chamber may still be inwardly reflective, and e.g. be of metal, or of other conductive material(s), and can additionally be covered with something to resemble a top layer of asphalt or other road covers. Such a chamber may be referred to as semi-anechoic.

The chamber may be intended and adapted for measurements of cars only, but may also be arranged for measurement of busses and trucks, as well as other types of vehicles.

The car/vehicle is preferably provided with a device for wireless communication, such as for the LTE/4G system, or for another communication system such as WiFi, 3G, 2G, IEEE 802.1 1 b/g/n (WiFi), worldwide interoperability for microwave access (WiMAX). The device may also be mounted in or even integrated with the vehicle itself.

The chamber antenna is an array antenna, comprising a horizontal linear array of antenna elements, and providing a planar wave in near-field. It has been found that such an antenna provides great advantages in the context of the present apparatus. The measurements hereby become more robust and reliable, and for example where and how the vehicle is arranged on the platform becomes less critical. An antenna on the vehicle arranged offset from the rotation axis of the platform will be subject to more identical measuring conditions the entire time, regardless of the rotational position of the platform, than if one antenna element was used.

The chamber antenna is preferably a dual-polarized two-port array antenna, wherein the horizontally polarized ports of all antenna elements are connected to a common single port via a corporate distribution network, and the vertically polarized ports of all elements are connected to another corporate distribution network. Thereby, all elements of the array are excited with the same phase. They may be excited with an amplitude taper towards the two ends of the array, in order to improve the near-field plane-wave performance across the vehicle.

The chamber antenna may also comprise antenna elements arranged in a plurality of overlying horizontal rows, the antenna thereby being a planar two-dimensional array, and preferably a two port planar array. Hereby, height adjustment of the antenna becomes less critical, and the measurement becomes more robust and reliable. In particular, this planar array will realize a much better plane wave illuminating the vehicle. Preferably, two corporate distribution networks are provided, as for the case of the horizontal array, so that all elements are excited with the same phase, and there may be a tapering of the excitation amplitude towards the 2 or 4 of the sides of the array, in order to improve the near-field plane wave performance across the vehicle.

The linear array may comprise any number of antenna elements. However, preferably the linear array comprises at least 24 elements, and even more preferably 48 elements when testing communications between 1 and 3 GHz. The number of elements may be much larger at higher frequency. The antenna elements are preferably arranged equidistantly, i.e. the distance between the antenna elements is preferably the same between all neighboring elements. Further, the total length of the horizontal array is preferably at least 2 m longer than the vehicle.

Further, in case a planar array is used, the array comprises M vertical elements×N horizontal elements, where M corresponds to the number of antenna elements in each row, i.e. in the horizontal linear arrays, and N corresponds to the number of rows, i.e. the number of antenna elements in vertical columns or vertical arrays. The number of horizontal arrays, i.e. rows in the planar array, is preferably at least 16, and most preferably at least 24 when testing communications between 1 and 3 GHz. The number of elements may be much larger at higher frequency. The planar array combines the advantages of vertical and planar arrays, respectively. The planar array is preferably tiltable. The length of the planar array is typically 2 m longer than the vehicle, and the height is typically 1 m higher than the highest vehicle to be measured.

However, although planar arrays are very efficient and have excellent radiation properties, a planar array requires many elements, making the antenna very expensive. Further, the more antenna elements, the more wiring and power dividers/combiners become necessary, and the antenna also becomes heavier and more difficult to handle.

This can be improved by replacing the planar array with a cylindrical parabolic reflector fed by a linear array along the focal line.

To this end, alternative ways of increasing the height of the antenna are feasible. In a preferred alternative embodiment, the chamber antenna further comprises a cylindrical parabolic reflector, fed by a linear array along the focal line. This means that the reflector is straight in a horizontal direction and arranged in a parabolic curve in a vertical direction. The horizontal linear array is arranged along the focal line of the parabolic arc formed by the reflector. Forming of a reflector into a curved, parabolic shape in one direction is simple and cost-effective compared to forming of two-dimensional shapes, such as disc shaped reflectors. For example, a mechanical support structure may be provided, and a planar sheet of reflective material may be pressed and fastened to the mechanical support structure, e.g. by means of rivets, pop fasteners or the like.

The height of the lower edge of the curved reflector (which also is approximately the height of the focal line) is preferably in the range of 0.2-0.4 H, where H is the height of the antenna elements on the vehicle, which generally corresponds to the height of the vehicle, at least when the antennas are arranged on the roof. The height of the upper edge of the reflector should preferably be at least 1 m higher than the highest vehicle to be measured.

The horizontal extent of the linear array preferably comprises at least 24 elements, and even more preferably at least 48 elements when testing communications between 1 and 3 GHz. The length is typically 2 m longer than the vehicle, and the reflector can with advantage even be somewhat longer than the array.

The array of antenna elements is preferably arranged to provide good near-field properties. The existence of grating or side lobes is acceptable, as it does not illuminate the car itself. The grating lobes depend on the separation distance between the antenna elements.

In experimental tests it has e.g. been found that an array antenna of about 2.5 m in length and with 36 equidistant Huygens sources as elements provided a good plane wave. By increasing the array, to comprise 54 equidistant Huygens sources arranged over about 6 m, the plane wave is present over a much wider region giving better results for large vehicles. Thus, it has been concluded that width and uniformity of the plane wave may be efficiently controlled by appropriate selection of the number of antenna elements, the overall length of the array, and the distance between the antenna elements.

The antenna preferably has a height in the longitudinal direction which exceeds the height of the vehicle.

Further, the antenna, such as the above-discussed reflector antenna, may be tiltable in forward/backward direction. For example, the antenna may be tiltable to 10°-40°, such as in the range 20°-30°.

The chamber antenna is preferably moveable within the chamber, and preferably provided with wheels, thereby facilitating said movement. Hereby, the position of the antenna can easily be adjusted for measurement on different vehicles, different types of measurement, etc. Further, the antenna hereby becomes easy to move around, both within a chamber, and between chambers. Further, it is hereby possible to use previously existing EMC chambers as the new measurement apparatus, by retrofitting the chambers with a new chamber antenna, etc.

The apparatus preferably further comprises a corporate distribution network of cables and power dividers, i.e. a branched distribution network, connecting the horizontal linear or vertical planar array antenna to the wireless communication test instrument, working as a base station emulator. There may also be an electronic so-called channel emulator between the base station emulator and the base station, providing the opportunity to vary the time delay spread during the measurements. The distribution network is preferably arranged to provide, together with the array of antenna elements, a plane wave in near field, thereby simulating base stations far away. The near-field is hence provided by means of hardware.

The linear array antenna may be dual-polarized, or there may be two such linear antennas located adjacent to each other, one for each of two orthogonal polarizations. The linear array(s) may be arranged in various positions within the chamber, and preferably along a wall of the chamber.

When several linear array antennas are provided to form a vertical planar array, said linear array antennas are further preferably connected together with distribution networks in such a way that the two common output ports represents a quantity that is proportional to the far-field of the antennas system on the car in one azimuthal direction (depending on angle of the platform on which the vehicle is located) and elevation direction (depending on the tilt angle of the arrays towards the vehicle). In this case, there is one port per polarization, and the polarizations may be horizontal/vertical, or +/−45° tilted, for the two ports. Slant +/−45° polarizations are often used in base stations.

The planar array and linear array with parabolic cylindrical reflector correspond to so-called compact ranges in traditional anechoic chamber based antenna measurement technology. However, the requirements of systems for OTA measurements are very different from those of traditional far-field measurement ranges. E.g., measuring PoD does not require very accurate polarization and sidelobe measurements. The reasons are that most antennas on cars are designed to be omnidirectional, and, if two polarizations are available, they do not need to be aligned with the polarizations of the base station in order to provide the double throughput following polarization multiplexing, due to the MIMO algorithms that handles the polarization misalignment. Therefore, OTA RLOS test ranges can be built on other requirements than traditional compact ranges.

In case of a planar array antenna or linear array provided with a parabolic reflector, the height of the antenna is preferably greater than the height of the car or vehicle. The width (i.e. the horizontal length) of the array antenna is preferably at least the same as the maximum distance between center turntable where the car is located, and the antenna on the car (or the antenna that is located most far from the center of the turntable), and preferably at least longer than the length of the car.

The above-discussed test chamber may be made very small compared to presently available anechoic chambers for measurement on vehicles, but with the same or improved accuracy of the measurements in terms of throughput/PoD. Specifically, the now proposed random-LOS chamber can emulate base stations at far-away distances, test MIMO under random-LOS, need not consider accuracy in position angle, produces CDF (Cumulative Distribution Function) in random-LOS for low elevation angles, and do not need accurate sidelobes and so on.

The height, length and width of the chamber can be very small compared to previously known chambers. Previously known anechoic test chambers for measurement of cars would typically require a chamber size of 25 m length, 15 m width and 10 m height. As a comparison, a random-LOS chamber of the present invention would for the same situation typically have a size of 7 m length, 7 m width and 2.5 m height. Similarly, a measurement chamber for a bus would previously be of a size of e.g. 30 m length, 20 m width and 15 m height, whereas with the present invention, the size may be reduced e.g. to 16 m length, 16 m width and 4.6 m height.

The height of the internal air-filled volume of the chamber may be only slightly higher than H, such as in the range of H+0.1 m and H+3 m, or in the range of H+1 and H+3 m, where H is the height of the highest vehicle on which the chamber is intended to measure (when it is located on the rotatable platform). For example, the height may be as low as only vehicle (car) height+1 m or even lower. A lower height makes the chamber less expensive.

The length and width of the internal volume of the chamber may both be in the range of L+1.5 m and L+4 m, where L is the length of the longest vehicle (or width of the vehicle, should that be greater) on which the chamber is intended to measure. Typically, the room floor dimension is in both dimensions typically 2 m longer than the vehicle (car), but it can also be longer than 2 m. When 2 m longer, the wall of the chamber will everywhere be more than 1 m away from any part of the vehicle. Reduced horizontal dimensions make the chamber less expensive. The apparatus further preferably comprises at least one linear array antenna within the chamber. Such a solution is, as already discussed, particularly suitable for random LOS chambers.

These and other features and advantages of the present invention will in the following be further clarified with reference to the embodiments described hereinafter.

BRIEF DESCRIPTION OF THE DRAWINGS

For exemplifying purposes, the invention will be described in closer detail in the following with reference to embodiments thereof illustrated in the attached drawings, wherein.

DETAILED DESCRIPTION OF PREFERRED EMBODIMENTS

In the following detailed description, preferred embodiments of the present invention will be described. However, it is to be understood that features of the different embodiments are exchangeable between the embodiments and may be combined in different ways, unless anything else is specifically indicated. Even though in the following description, numerous specific details are set forth to provide a more thorough understanding of e present invention, it will be apparent to one skilled in the art that the present invention may be practiced without these specific details. In other instances, well-known constructions or functions are not described in detail, so as not to obscure the present invention.

Figure 1:
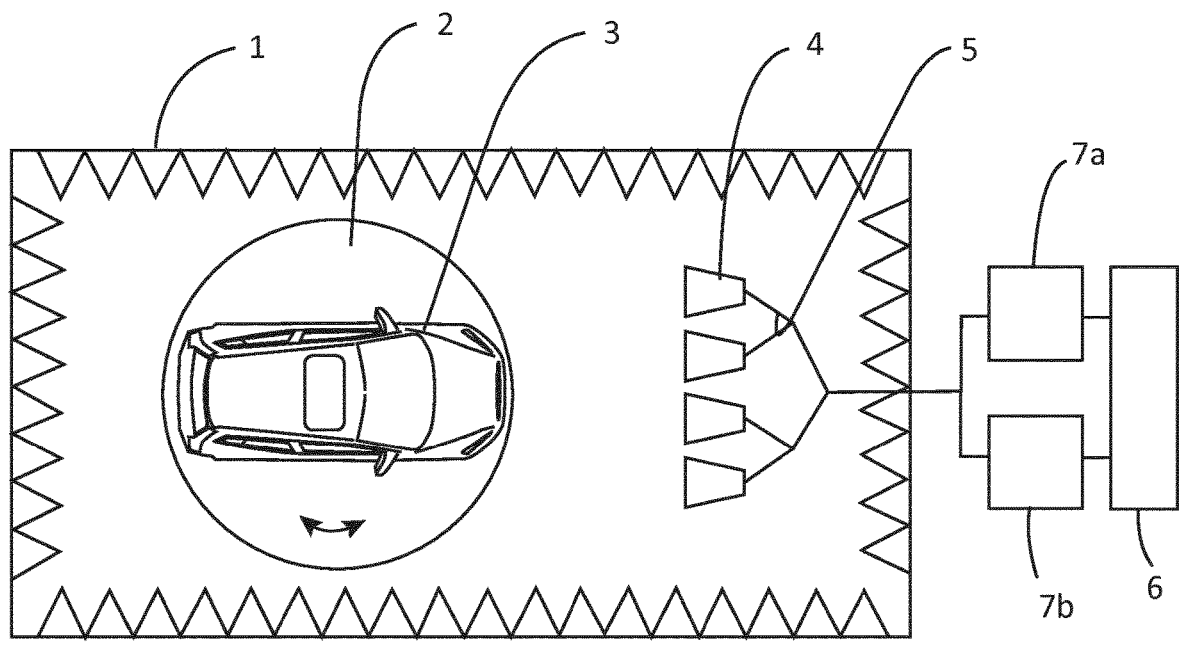
FIG. 1 is a schematic top view showing the interior of a random-LOS chamber apparatus in accordance with another embodiment of the present invention.

An apparatus for measuring over-the-air (OTA) wireless communication performance in an automotive application of a device under test arranged on or in a vehicle is shown in FIG. 1. The apparatus comprises a random-LOS chamber 1, having inwardly absorbing walls. The random-LOS chamber has absorbers on most, and preferably all walls, rendering the walls absorbing to electromagnetic waves, thereby simulating a random-LOS environment. The internal chamber formed in the chamber is preferably completely shielded, having reflecting material, such as metal, on all walls and floor and ceiling, and having absorbers being provided on all or most walls and ceiling, but not on the floor. The floor is preferably of metal (or conductive), but the metal can be covered with something to resemble a top layer of asphalt or other road covers. The floor and roof may be inwardly absorbing as well, providing an anechoic chamber, as in previously known EMC chambers. However, for practical reasons, e.g. the floor of the chamber may be inwardly reflective, but covered with a top layer, e.g. arranged to resemble asphalt or other road covers. This may be referred to as an semi-anechoic chamber.

Further, a rotatable platform 2 is provided within the chamber, and enclosed within the internal volume. The platform is arranged to support and rotate a vehicle 3 on it, such as a car, a bus or any other type of vehicle. A device under test (DUT) is arranged in or on the vehicle. The device under test can e.g. be a communication device arranged within the car, and having an exteriorly mounted antenna, or several antennas, e.g. to provide MIMO or SIMO transmission. However, it may also be a communication device having an integrated antenna and being operated within the car, such as a mobile phone, a tablet PC, a computer or the like being operated within the car.

The rotatable platform is preferably capable of rotating the vehicle completely, i.e. 360 degrees. The rotation may be controlled by a control PC, in same way as for the per se known platform stirring used in U.S. Pat. Nos. 7,444,264, 7,286,961 and WO 12/171562, so that rotation can be performed intermittently or continuously during measurement.

By rotation of the vehicle during measurement, either intermittently or continuously it is e.g. possible to obtain different far field directions in azimuth plane.

Further, a chamber antenna/measurement antenna 4 is arranged in the chamber. The antenna comprises a horizontal linear array antenna. The horizontal linear array antenna may be dual-polarized, or there may be two orthogonally polarized linear arrays located side-by-side, and e.g. arranged along a wall of the chamber. The linear array comprises a plurality of antenna elements, preferably equidistantly arranged in a linear direction.

The antenna elements are connected via a corporate distribution network 5, and preferably two corporate distribution networks to provide two polarizations. A measuring instrument 6 is further provided for measuring the transmission between the chamber antenna and the DUT on the vehicle, and thereby to measure one or several parameters related to the communication performance of the device under test. The measuring instrument may be arranged externally from the internal volume, and connected to the internal volume by means of a cable. The measurement instrument preferably comprises analyzing means, e.g. realized by dedicated software on a personal computer or the like, and can e.g. comprise a commercially available measuring instrument, such as a network analyzer or spectrum analyzer or similar, for determining the transmitted power between the antennas. Additionally or alternatively, the measuring instrument may comprise a base station emulator.

The corporate distribution networks 5 preferably connect the horizontal vertical linear array elements for each polarization to a respective port 7a and 7b, here connected to a base station emulator 6, including or connected to a controller, such as a PC. The corporate distribution network preferably comprises a number of branched connections, separating the output/input from the base station emulator into a number of equally fed inputs/outputs connected to the antenna elements.

In an illustrative example, the corporate distribution network may have a first branched connection, separating the line into two, two second branched connections, separating the two lines into four, and four third branched connections, separating the four lines into eight, etc. However, other branching arrangements, e.g. using branching into three, using more or fewer layers of branched connections, etc. are feasible. Such a fixed distribution arrangement is very efficient to provide a simple interface between the linear array and the base station emulator, and is also very cost-efficient.

The linear array 4 preferably comprises a plurality of wideband array elements, providing a plane wave near-field performance.

Figure 2:
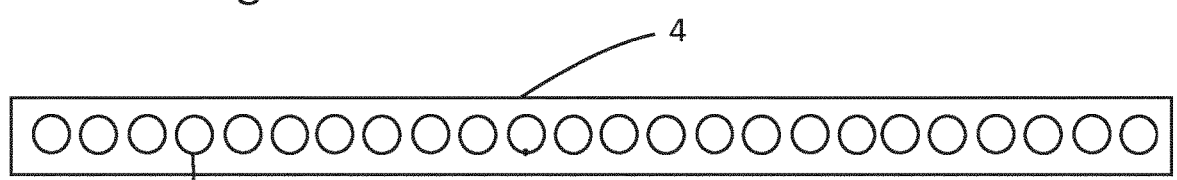
FIG. 2 is a schematic side view illustration of an exemplary horizontal linear array antenna to be used in the apparatus of FIG. 1.

The chamber antenna 4 may comprise a single line of antenna elements 4a, as schematically illustrated in FIG. 2. The linear array may comprise any number of antenna elements, such as 24 elements. The antenna elements are preferably arranged equidistantly, i.e. the distance between the antenna elements is preferably the same between all neighboring elements. However, the horizontal array may also comprise fewer or more antenna elements, such as 48 antenna elements.

Figure 3:
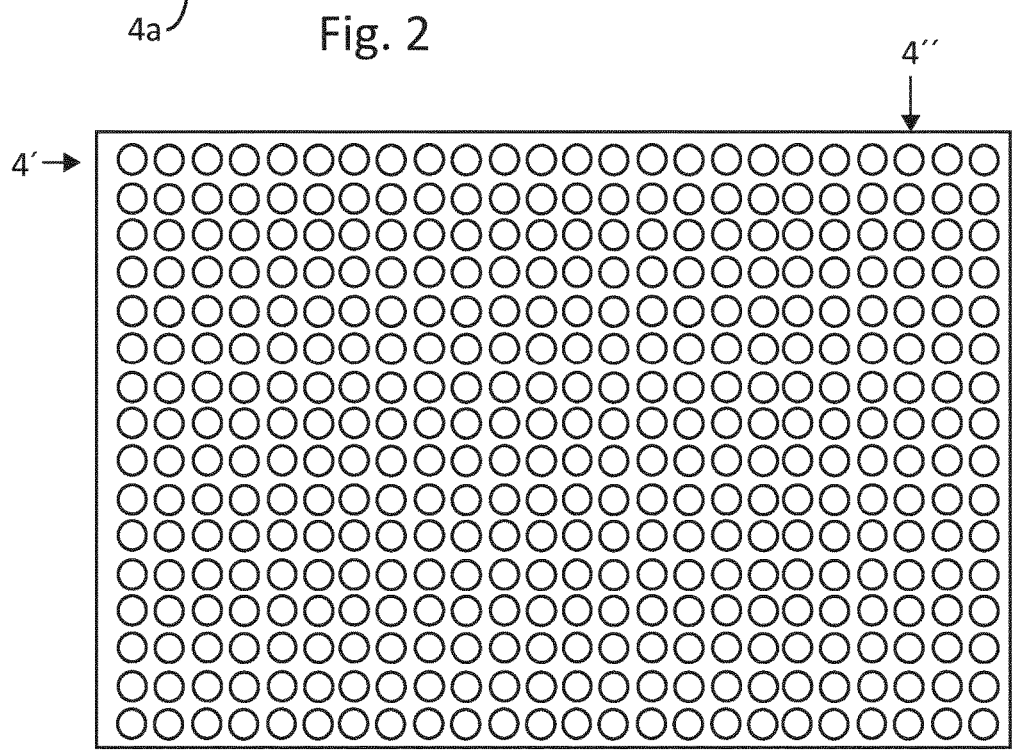
FIG. 3 is a schematic side view illustration of an alternative embodiment of a vertical planar array antenna useable in the apparatus of FIG. 1.

The chamber antenna may also comprise antenna elements arranged in a plurality of overlying horizontal rows 4', or correspondingly a plurality of side-by-side vertical rows 4", the antenna thereby being a planar two-dimensional array, and preferably a two port planar array. Such an antenna is schematically illustrated in FIG. 3. The number of horizontal arrays, i.e. rows in the planar array, is preferably at least 16, and most preferably at least 24. However, fewer or more rows are also feasible. Thus, the resulting planar array may e.g. have 24×16 elements, as in the schematically illustrated example of FIG. 3. The planar array combines the advantages of vertical and planar arrays, respectively. The planar array is preferably tiltable.

Figure 4A:
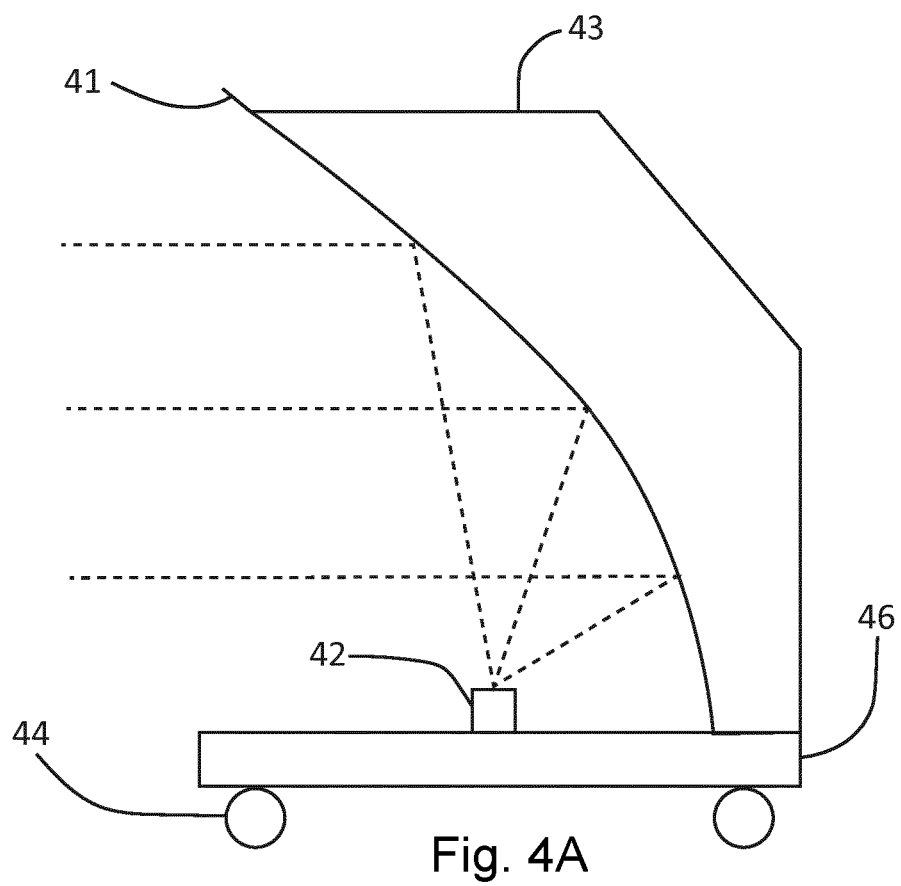
FIGS. 4A and 4B are a side view and a front view, respectively, of another alternative embodiment of an antenna useable in the apparatus of FIG. 1.
Figure 4B:
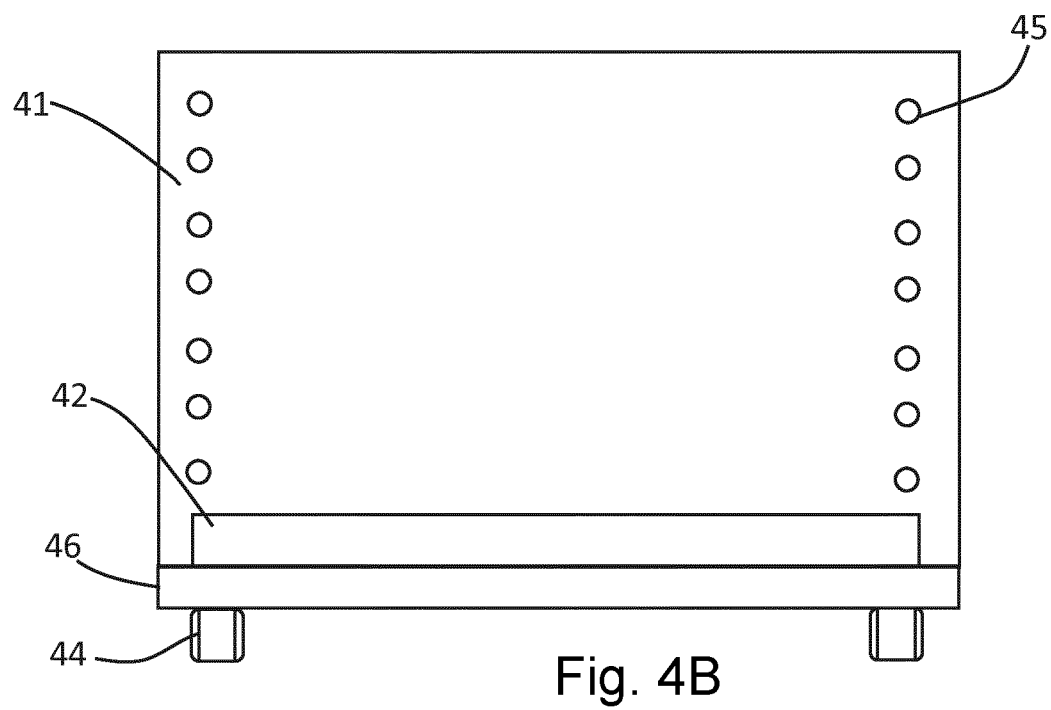

In another embodiment, the antenna is instead a cylindrical reflector fed by a linear array along the focal line, as illustrated in FIGS. 4a and 4b. In this embodiment, the chamber antenna comprises a reflector 41, fed by a linear array 42 along a focal line. The reflector is preferably straight in a horizontal direction and arranged in a parabolic curve in a vertical direction. The horizontal linear array 42 is preferably arranged in the focal line of the parabolic arc formed by the reflector.

Figure 5:
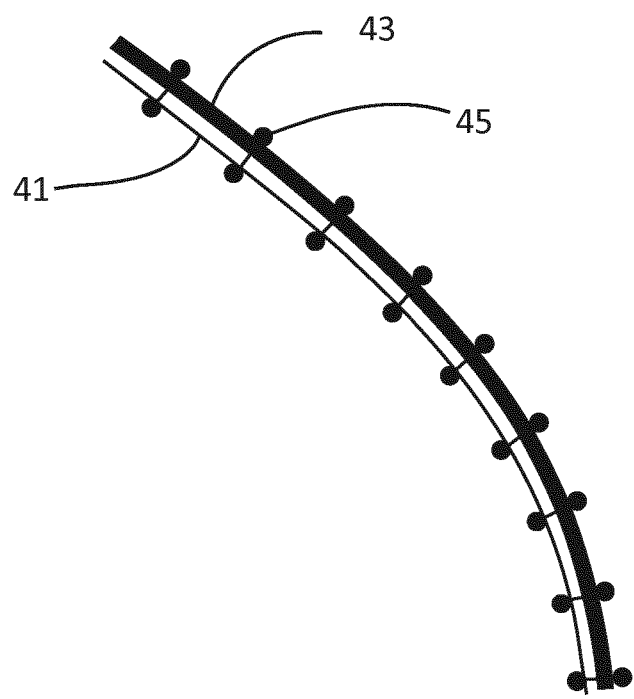
FIG. 5 is a cross-sectional side view, schematically illustrating a parabolic arc shaped reflector as used in the antenna of FIG. 4.

Forming of a reflector into a curved, parabolic shape in one direction is simple and cost-effective. For example, a mechanical support structure 43 may be provided, and a planar sheet of reflective material may be pressed and fastened to the mechanical support structure by fasteners 45, e.g. by means of rivets, pop fasteners or the like. This is schematically illustrated in FIG. 5. The support structure may be formed by formed metal, such as aluminum, formed plastic, wood or the like. Further, the support structure may comprise a surface corresponding to the desired reflector surface, or comprise areas corresponding to said desired surface. For example, the support structure may only comprise the outer boarders of the desired surface. Further, the antenna, such as the above-discussed reflector antennas, may be tiltable in forward/backward direction. For example, the antenna may be tiltable to 10-40 percent, such as in the range 20-30 percent.

The chamber antenna is preferably moveable within the chamber, and preferably provided with wheels 44, thereby facilitating said movement. The antenna may further comprise a base or support 46, carrying the other elements of the antenna.

Figure 6A:
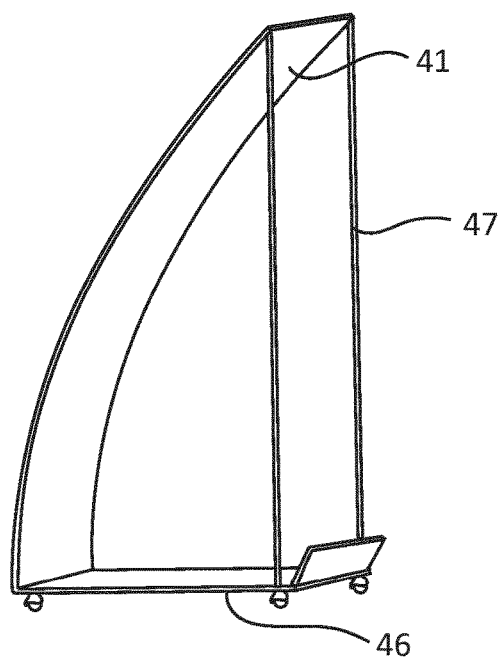
FIGS. 6A, 6B and 6C is a view in different perspectives of another alternative embodiment of an antenna useable in the apparatus of FIG. 1.
Figure 6B:
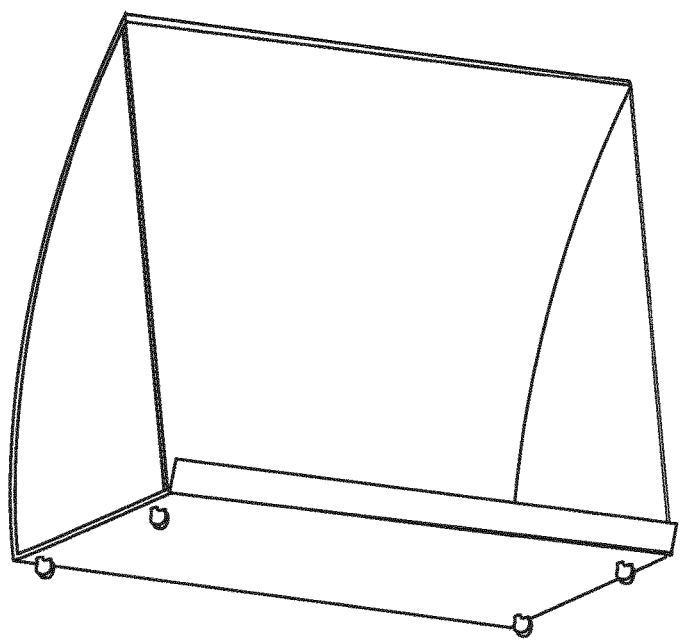
Figure 6C:
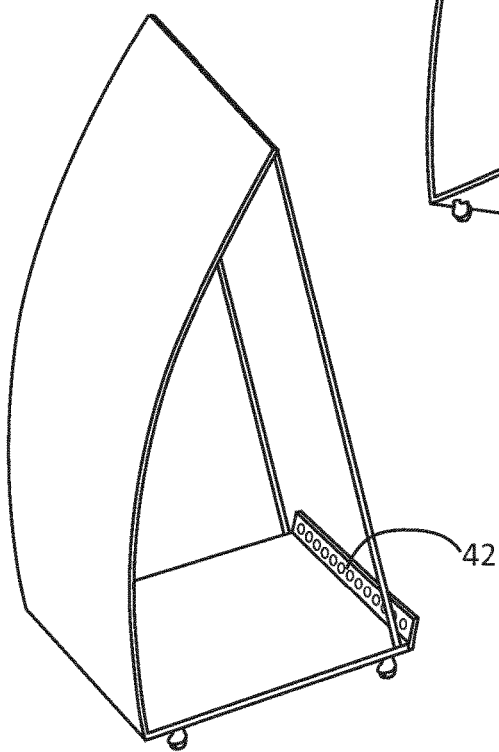

FIGS. 6A, 6B and 6C illustrate a similar type of reflector array antenna. In this embodiment, the chamber antenna also comprises a reflector 41, arranged in a parabolic curve, and fed by a linear array 42 along a focal line. The reflector is here formed of a relatively rigid metal sheet directly formed into the desired shape, thereby alleviating the need for any additional mechanical support structure. However, supporting pillars 46 may be arranged for example in the corners to increase the stability of the antenna. The pillars may be provided between the base 46 and the upper end of the reflector.

Many different type of known antenna elements may be used for realization of the above-discussed antennas, such as Huygen source antennas and the like.

Figure 7:
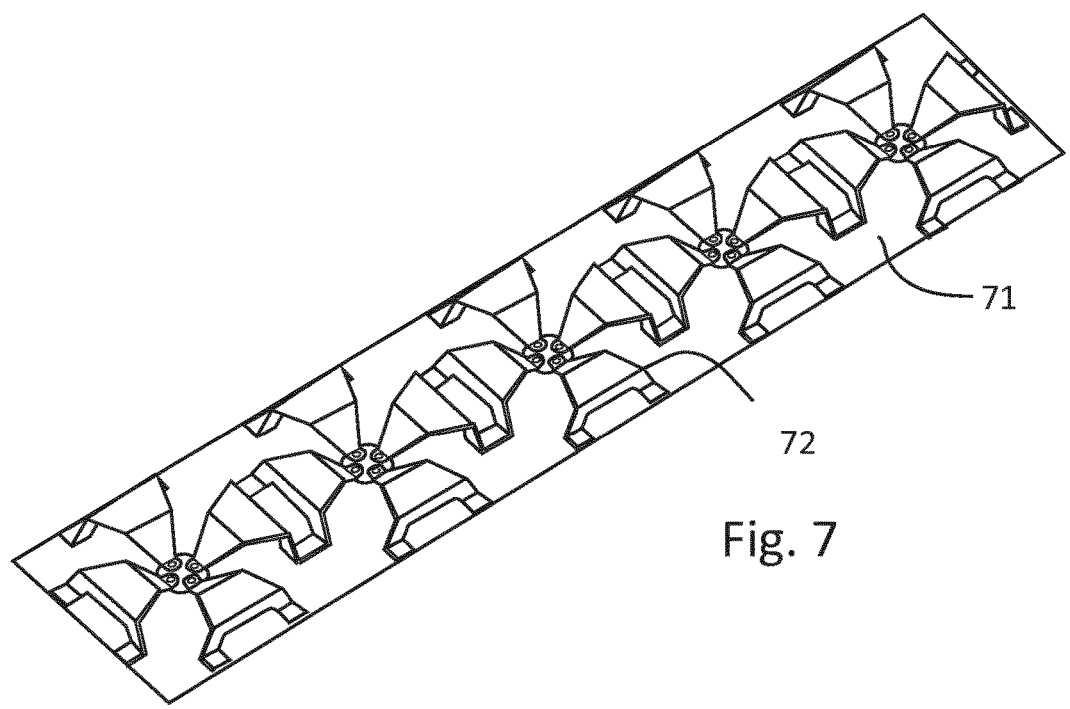
FIG. 7 is a view of a linear array antenna of another alternative embodiment of a disclosure.
Figure 8:
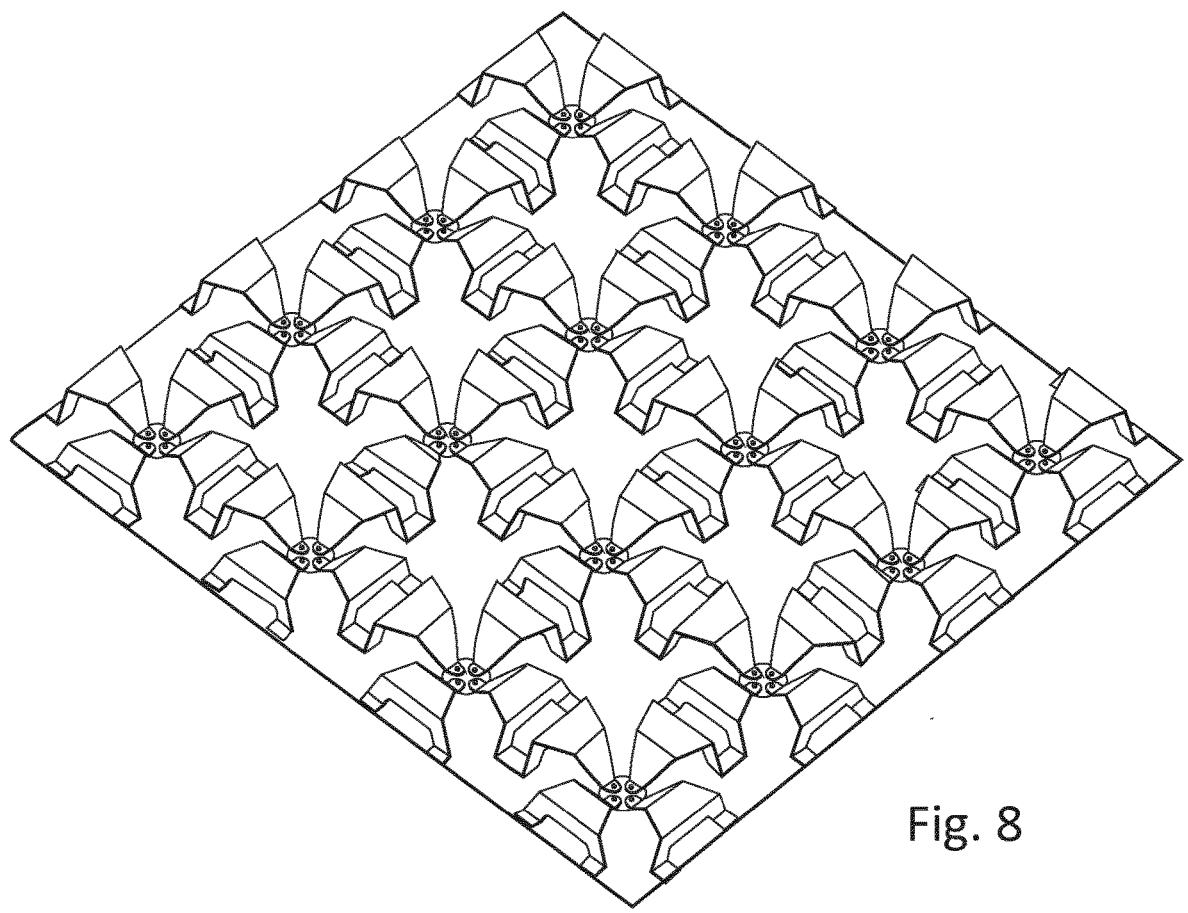
FIG. 8 is a view of a planar array antenna of another alternative embodiment of a disclosure.

In a preferred embodiment, as illustrated in the linear array antenna of FIG. 7 and the planar array antenna of FIG. 8, the antenna elements comprises self-grounded antenna elements comprising a base or central portion 71 arranged in a first plane and a number of arm sections 72, and preferably four arm sections, associated with the central portion. Each arm section tapers towards a respective end tip and comprising an electrically, conducting material. Each arm section is adapted to form a transition from the central portion and being bent backwards towards the central portion by more than 180 degrees and being so arranged that its end tip approaches the central portion on a side thereof at an opening arrangement in the central portion. The end tips are further adapted to be connected to a feeding port. Preferably, there is a specific port for each arm section, and each of the arm sections may further comprise a mixed functionality of a curved monopole antenna and a loop antenna. Such antenna elements are per se known from WO 14/062112 by the same Applicant, said application hereby being incorporated in its entirety by reference.

This type of antenna elements, which may be referred to as a "bowtie" antenna may be used in a horizontal array antenna, as illustrated in FIG. 7, or in a planar array antenna, as illustrated in FIG. 8. In these illustrative examples, only a limited number of antenna elements are shown. However, any number of antenna elements may be used also in these embodiments. Further, the horizontal array of FIG. 7 may be used also in combination with a parabolic curve reflector, as in the embodiments of FIGS. 4A, 4B, 6A, 6B and 6C.

The invention has now been described with reference to specific embodiments. However, several variations of the communication system are feasible. For example, the chamber is preferably, out of practical reasons, of a rectangular shape. However, other shapes, which are easy to realize, may also be used, such as vertical walls with flat floor and ceiling and with a horizontal cross-section that forms a circle, ellipse or polygon. Further, the communication between the device under test and the chamber antenna/measurement antenna may be in either or both directions. Accordingly, each antenna may be arranged for either transmitting or receiving, or both. Further, the various features discussed in the foregoing may be combined in various ways. The embodiment of the random-LOS case describes a linear array antenna with a distribution/combination network. It is envisioned that this distribution network also may be realized digitally, by having DA AD converters and transmitting/receiving amplifiers connected to each port of the linear array. Then, the amplitude and phase can be controlled digitally, so that the mechanical tilt of the antenna will be unnecessary. Such and other obvious modifications must be considered to be within the scope of the present invention, as it is defined by the appended claims. It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting to the claim. The word "comprising" does not exclude the presence of other elements or steps than those listed in the claim. The word "a" or "an" preceding an element does not exclude the presence of a plurality of such elements.

The invention claimed is:

1. An apparatus for measuring over-the-air (OTA) wireless communication performance in an automotive application of a device under test arranged on or in a vehicle, comprising:
    a chamber defining an internal volume therein;
    a platform for supporting the vehicle, wherein the chamber is adapted to enclose the platform and wherein the platform is a rotatable platform that can rotate the vehicle;
    at least one chamber antenna provided in the volume; and
    a communication system test instrument measuring the transmission between the device under test and the chamber antenna;
    wherein the chamber antenna is an array antenna, comprising a horizontal linear array of antenna elements and a reflector, the reflector being straight in a horizontal direction and arranged in an arc shape in a vertical direction, and the horizontal linear array being arranged in the focal line of said reflector, the chamber antenna providing a plane wave in near-field where the vehicle is located,
    wherein the apparatus is adapted to measure at least one of the following communication performance parameters: total radiated power (TRP), total isotropic sensitivity (TIS), throughput, antenna efficiency, average fading sensitivity and diversity and MIMO gain.

2. The apparatus of claim 1, wherein the chamber antenna is a dual-polarized two port array antenna, wherein the horizontally polarized ports of all antenna elements are connected to a common single port via a corporate distribution network, and the vertically polarized ports of all elements are connected to a common single port via another corporate distribution network.

3. The apparatus of claim 1, wherein the chamber antenna is moveable within the chamber.

4. The apparatus of claim 1, wherein the chamber antenna has a height in the longitudinal direction which exceeds the height of the vehicle.

5. The apparatus of claim 1, wherein the floor of the chamber is inwardly reflective.

6. The apparatus of claim 1, wherein the platform is arranged to be rotatable 360 degrees continuously or intermittently during measurement.

7. The apparatus of claim 1, wherein the chamber is a random-LOS chamber, having inwardly absorbing walls.

8. The apparatus of claim 1, wherein the floor of the chamber is covered with a top layer to resemble asphalt or other road covers.

9. An apparatus for measuring over-the-air (OTA) wireless communication performance in an automotive application of a device under test arranged on or in a vehicle, comprising:
    a chamber defining an internal volume therein;
    a platform for supporting the vehicle, wherein the chamber is adapted to enclose the platform and wherein the platform is a rotatable platform that can rotate the vehicle;
    at least one chamber antenna provided in the volume; and
    a communication system test instrument measuring the transmission between the device under test and the chamber antenna;
    wherein the chamber antenna is an array antenna, comprising a horizontal linear array of antenna elements and a reflector, the reflector being straight in a horizontal direction and arranged in an arc shape in a vertical direction, and the horizontal linear array being arranged in the focal line of said reflector, the chamber antenna providing a plane wave in near-field where the vehicle is located,
    further comprising a branched distribution network connecting the horizontal linear array antenna to a base station emulator.

10. An apparatus for measuring over-the-air (OTA) wireless communication performance in an automotive application of a device under test arranged on or in a vehicle, comprising:
    a chamber defining an internal volume therein;
    a platform for supporting the vehicle, wherein the chamber is adapted to enclose the platform and wherein the platform is a rotatable platform that can rotate the vehicle;
    at least one chamber antenna provided in the volume; and
    a communication system test instrument measuring the transmission between the device under test and the chamber antenna;
    wherein the chamber antenna is an array antenna, comprising a horizontal linear array of antenna elements and a reflector, the reflector being straight in a horizontal direction and arranged in an arc shape in a vertical direction, and the horizontal linear array being arranged in the focal line of said reflector, the chamber antenna providing a plane wave in near-field where the vehicle is located,
    wherein the chamber antenna is tiltable to assume different tilt angles in an elevation plane.

11. An apparatus for measuring over-the-air (OTA) wireless communication performance in an automotive application of a device under test arranged on or in a vehicle, comprising:
    a chamber defining an internal volume therein;
    a platform for supporting the vehicle, wherein the chamber is adapted to enclose the platform and wherein the platform is a rotatable platform that can rotate the vehicle;
    at least one chamber antenna provided in the volume; and
    a communication system test instrument measuring the transmission between the device under test and the chamber antenna;
    wherein the chamber antenna is an array antenna, comprising a horizontal linear array of antenna elements and a reflector, the reflector being straight in a horizontal direction and arranged in an arc shape in a vertical direction, and the horizontal linear array being arranged in the focal line of said reflector, the chamber antenna providing a plane wave in near-field where the vehicle is located, wherein a height of the internal volume is in the range of H+0.5 m and H+3 m, where H is the height of the highest vehicle on which the chamber is intended to measure.

12. An apparatus for measuring over-the-air (OTA) wireless communication performance in an automotive application of a device under test arranged on or in a vehicle, comprising:

a chamber defining an internal volume therein;

a platform for supporting the vehicle, wherein the chamber is adapted to enclose the platform and wherein the platform is a rotatable platform that can rotate the vehicle;

at least one chamber antenna provided in the volume; and a communication system test instrument measuring the transmission between the device under test and the chamber antenna;

wherein the chamber antenna is an array antenna, comprising a horizontal linear array of antenna elements and a reflector, the reflector being straight in a horizontal direction and arranged in an arc shape in a vertical direction, and the horizontal linear array being arranged in the focal line of said reflector, the chamber antenna providing a plane wave in near-field where the vehicle is located, wherein a length and width of the internal volume are both in the range of L+1.5 m and L+4 m, where L is the length of the longest vehicle on which the chamber is intended to measure.

13. An apparatus for measuring over-the-air (OTA) wireless communication performance in an automotive application of a device under test arranged on or in a vehicle, comprising:

a chamber defining an internal volume therein;

a platform for supporting the vehicle, wherein the chamber is adapted to enclose the platform and wherein the platform is a rotatable platform that can rotate the vehicle;

at least one chamber antenna provided in the volume; and a communication system test instrument measuring the transmission between the device under test and the chamber antenna;

wherein the chamber antenna is an array antenna, the chamber antenna comprising a horizontal linear array of antenna elements and a reflector, the reflector being straight in a horizontal direction and arranged in an arc shape in a vertical direction, and the horizontal linear array being arranged in the focal line of said reflector, the chamber antenna providing a plane wave in near-field where the vehicle is located.

* * * * *